United States Patent [19]
Yoo et al.

[11] Patent Number: 5,574,770
[45] Date of Patent: Nov. 12, 1996

[54] METHOD FOR CONTROLLING OVERLOAD OF MAIN PROCESSOR OF DISTRIBUTED SWITCHING SYSTEM WITH HIERARCHY STRUCTURE

[75] Inventors: Chan H. Yoo; Byung S. Lee; Young S. Kim, all of Daejeon, Rep. of Korea

[73] Assignees: Electronics and Telecommunications Research Institute; Korea Telecommunication Authority, both of Rep. of Korea

[21] Appl. No.: 344,175

[22] Filed: Nov. 23, 1994

[30] Foreign Application Priority Data

Dec. 21, 1993 [KR] Rep. of Korea .................. 1993-28938

[51] Int. Cl.⁶ ........................... H04M 3/22; H04M 15/00
[52] U.S. Cl. ............... 379/34; 379/111; 379/112; 379/113; 379/114; 379/115; 379/133; 379/134
[58] Field of Search .............................. 379/34, 111–115, 379/133, 134, 220, 221

[56] References Cited

U.S. PATENT DOCUMENTS

| | | | |
|---|---|---|---|
| 4,802,205 | 1/1989 | Eder ........................................ | 379/113 |
| 4,809,318 | 2/1989 | Schoute ................................... | 379/113 |
| 4,974,256 | 11/1990 | Cyr et al. ............................... | 379/113 |
| 4,984,264 | 1/1991 | Katsube ................................... | 379/220 |
| 5,060,258 | 10/1991 | Turner .................................... | 379/134 |
| 5,295,183 | 3/1994 | Langlois ................................. | 379/221 |

OTHER PUBLICATIONS

ITC 12, "Adaptation of the Overload Regulation Method Stator to Multiprocessor Controls and Simulation Results", Torino, Jun. 1988, seven pages.

"Two concepts for overload regulation in SPC switching systems: Stator and Tail", by G. Daisenberger, J. Oehlerich, and G. Wegmann, eight pages.

"System 12 Traffic Overload Control", by G. Morales Andres and M. Villen Altamirano, *Electrical Communication*, vol. 59, No. 1/2, 1985, pp. 74–79.

*Primary Examiner*—Wellington Chin
*Assistant Examiner*—Vijay Shankar
*Attorney, Agent, or Firm*—Merchant, Gould, Smith, Edell, Welter & Schmidt

[57] ABSTRACT

A method for controlling an overload of a main processor by assigning to the main processor of a distributed switching system with a hierarchy structure a function of informing associated lower-level processors of an occurrence of the overload, an increase in call suppression, a decrease in call suppression and a release of the overload upon controlling the overload, and assigning to the lower-level processors a function of automatically calculating the number of calls to be processed in response to a demand of the main processor, and controlling traffic affecting the main processor on the basis of the result of the calculation, so as to maintain a stable service condition for the overload control interval. A control for the overload is carried out by lower-level processors of the distributed type to calculate and control the number of calls to be accepted while a determination about the overload is carried out by a processor associated with the overload, capable of continuously providing stable services while minimizing failure of services through determination about and control of an overload. In the overload determination, an execution delay condition based on a priority assigned to the processor is taken into consideration, together with a CPU occupancy rate.

6 Claims, 10 Drawing Sheets

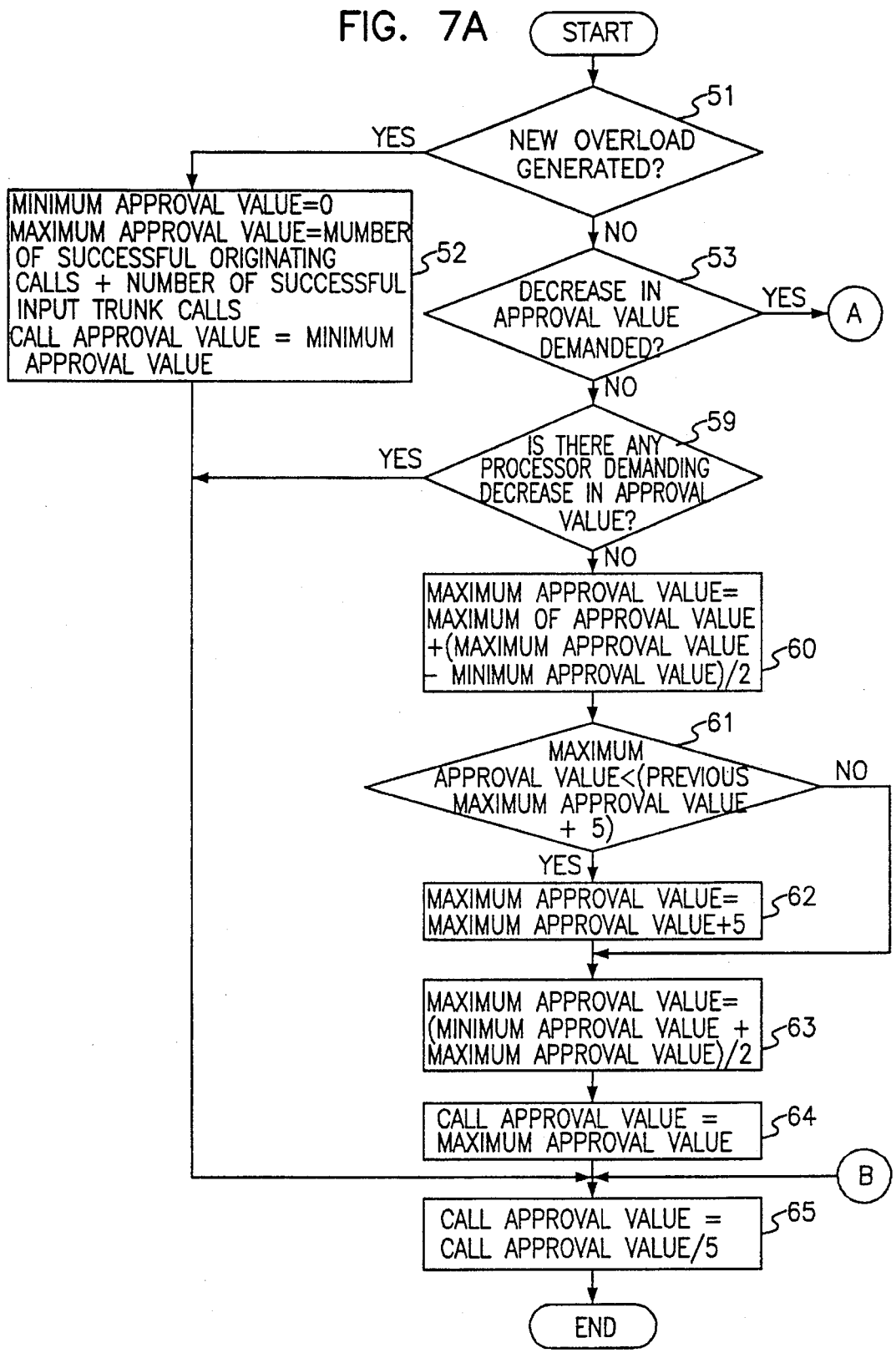

METHOD FOR CONTROLLING OVERLOAD OF MAIN PROCESSOR OF DISTRIBUTED SWITCHING SYSTEM WITH HIERARCHY STRUCTURE

BACKGROUND OF THE INVENTION

1. Field of the Invention

The present invention relates to a method for controlling an overload of a main processor of a distributed switching system with a hierarchy structure, and more particularly to a method for controlling a traffic overload occurring in a main processor of a switching system in which processing of subscriber calls and trunk calls are performed in a distributed manner while a number translation, a connection between space switches, and recording of accounting are performed in a centralized manner by main processors.

2. Description of the Prior Art

Conventional methods of controlling an overload of a main processor in a switching system with a hierarchy structure are classified into methods for determining the overload of the main processor and methods for controlling the overload of the main processor. As methods for determining the overload of the main processor, there have been known a method using a CPU occupancy rate, a method using a service queue of processors, and a method using the number of services required in the processors. In the case of the method using the number of services, a determination that the overload of the main processor has occurred is made when the number of services is not less than a particular critical value. As methods for controlling the overload of the main processor, there have been known a method of determining a call service ratio between call services to be accepted and call services to be suppressed in a control interval in accordance with the level of the overload, and a method of determining an interval of accepting all call services and an interval of suppressing all call services.

In the case of determining the overload only using the CPU occupancy rate, a determination that the overload has occurred may be made even if nothing interferes with the call processing service. This is because the CPU occupancy rate may be increased due to an operation maintenance software irrespective of call processing traffic. The erroneous determination results in a degradation in service quality. The present invention complements this method by monitoring a delay of execution of a call processing program and utilizes it for a determination about overload.

In the cases of using the length of the service queue of each processor and the number of calls generated, an analysis of sufficient field operating data and a precisely simulated test are required to derive the critical value used for the determination about overload. Furthermore, these methods have a disadvantage that the derived critical value should be varied depending on the type of call. The disadvantages encountered in the conventional methods of only utilizing the CPU occupancy rate, the service queue and the number of calls generated can be complemented by utilizing both the CPU occupancy rate and the monitoring for the execution delay of the processor.

In the method of controlling the overload, wherein new calls at a next interval are totally suppressed when the CPU occupancy rate is not less than the particular critical value are totally accepted when the CPU occupancy rate is less than the critical value, the control for the overload may be excessive because of an increased width between the increase in service and the decrease in service. On the other hand, the control method wherein the suppression rate is increased as the level of the overload increases has a possibility that an initial control will fail when an overload occurs due to an abrupt increase in load.

SUMMARY OF THE INVENTION

Therefore, an object of the invention is to solve the above-mentioned problems encountered in the prior art and, thus, to provide a method for controlling an overload of a main processor of a distributed switching system with a hierarchy structure, capable of assigning to the main processor a function of informing associated lower-level processors of an occurrence of the overload, an increase in call suppression, a decrease in call suppression and a release of the overload upon controlling the overload, and assigning to the lower-level processors a function of automatically calculating the number of calls to be processed in response to a demand of the main processor, and controlling traffic affecting the main processor on the basis of the result of the calculation, thereby maintaining a stable service condition for the overload control interval.

In accordance with the present invention, this object can be accomplished by providing a method for controlling an overload of a main processor of a distributed switching system with a hierarchy structure, wherein a control for the overload is carried out by lower-level processors of the distributed type to calculate and control the number of calls to be accepted while a determination about the overload is carried out by a processor associated with the overload, thereby being capable of continuously providing stable services while minimizing failure of services through determination about and control of an overload. In the overload determination, an execution delay condition based on a priority assigned to the processor is taken into consideration, together with a CPU occupancy rate, in accordance with a process execution management feature realized by a multiplex processing operating system. In the overload control, the main processor under an overload condition demands an increased call suppression and a decreased call suppression of lower-level processors. On the demand of the main processor, the lower-level processors calculate a call approval value indicative of the number of calls to be accepted for a control interval of 2 seconds, thereby controlling the overload of the main processor.

BRIEF DESCRIPTION OF THE DRAWINGS

Other objects and aspects of the invention will become apparent from the following description of embodiments with reference to the accompanying drawings in which:

FIGS. 7A and 7B are flow charts respectively illustrating a call approval value change routine of the access switching processor overload controller.

DETAILED DESCRIPTION OF THE PREFERRED EMBODIMENTS

Figure 1:
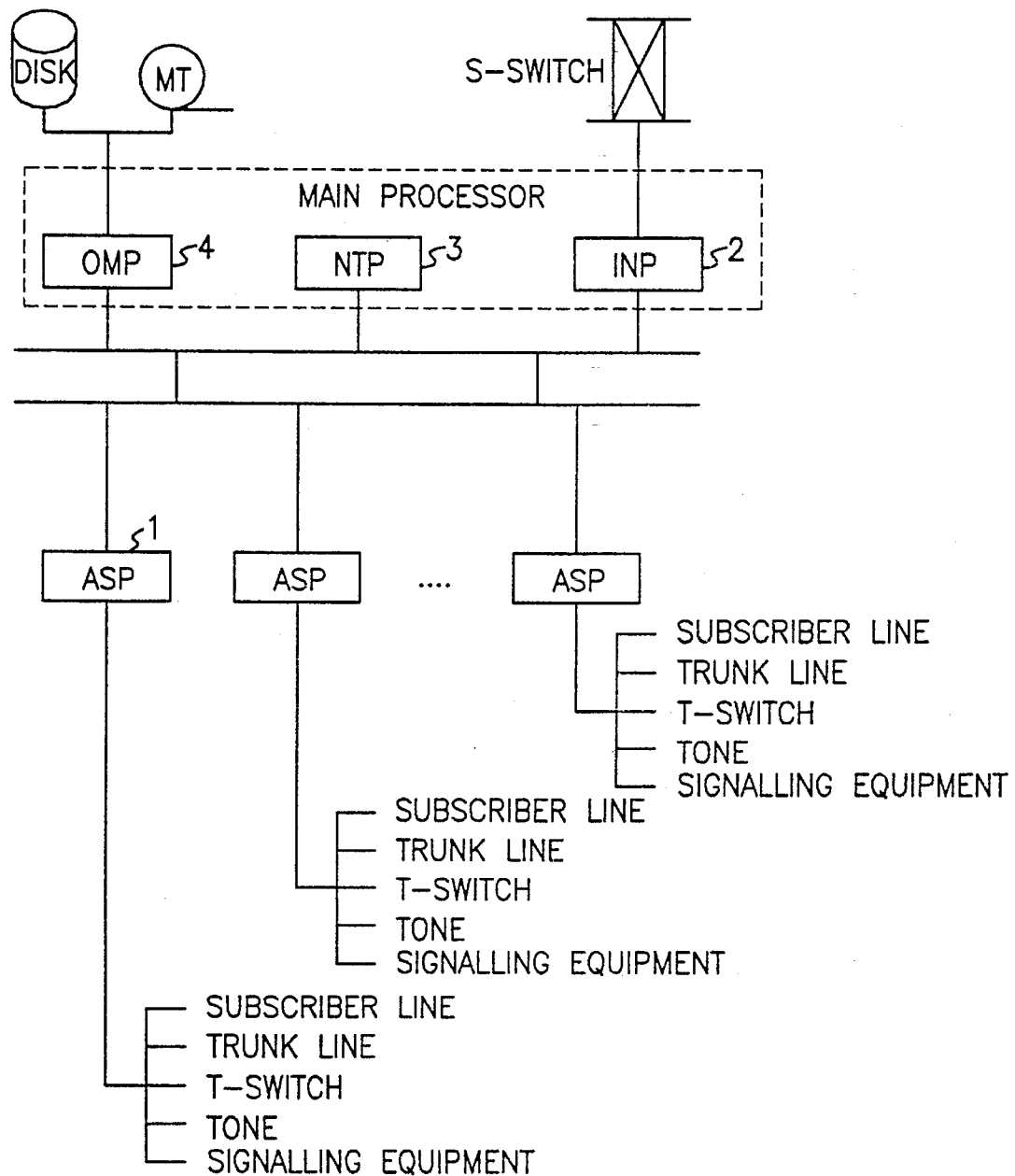
FIG. 1 is a block diagram illustrating a hardware system to which the present invention is applied.

FIG. 1 is a block diagram illustrating a hardware system to which the present invention is applied. As shown in FIG. 1, the system includes a plurality of access switching processors (ASP) 1 distributively operating to sense generation of originating calls on subscriber lines and trunk lines and perform access of terminating calls, an internal network processor (INP) 2 centrally operating to connect space switches, a number translating processor (NTP) 3 adapted to perform a number translation, and an operation and maintenance processor (OMP) 4 adapted to calculate an accounting and to store the calculated accounting.

For establishing a call, each of the ASPs 1 is provided with a subscriber line, a trunk line, signaling equipment, tone equipment and a time switch. In the INP 2, the space switches are equipped. On the other hand, the OMP 4 includes a magnetic tape driver MK and a hard disk DISK.

Each of INP 2, NTP 3 and OMP 4 is an upper-level processor, namely, a main processor. These processors as main processors operate in the same manner upon determining and controlling an overload.

Figure 2:
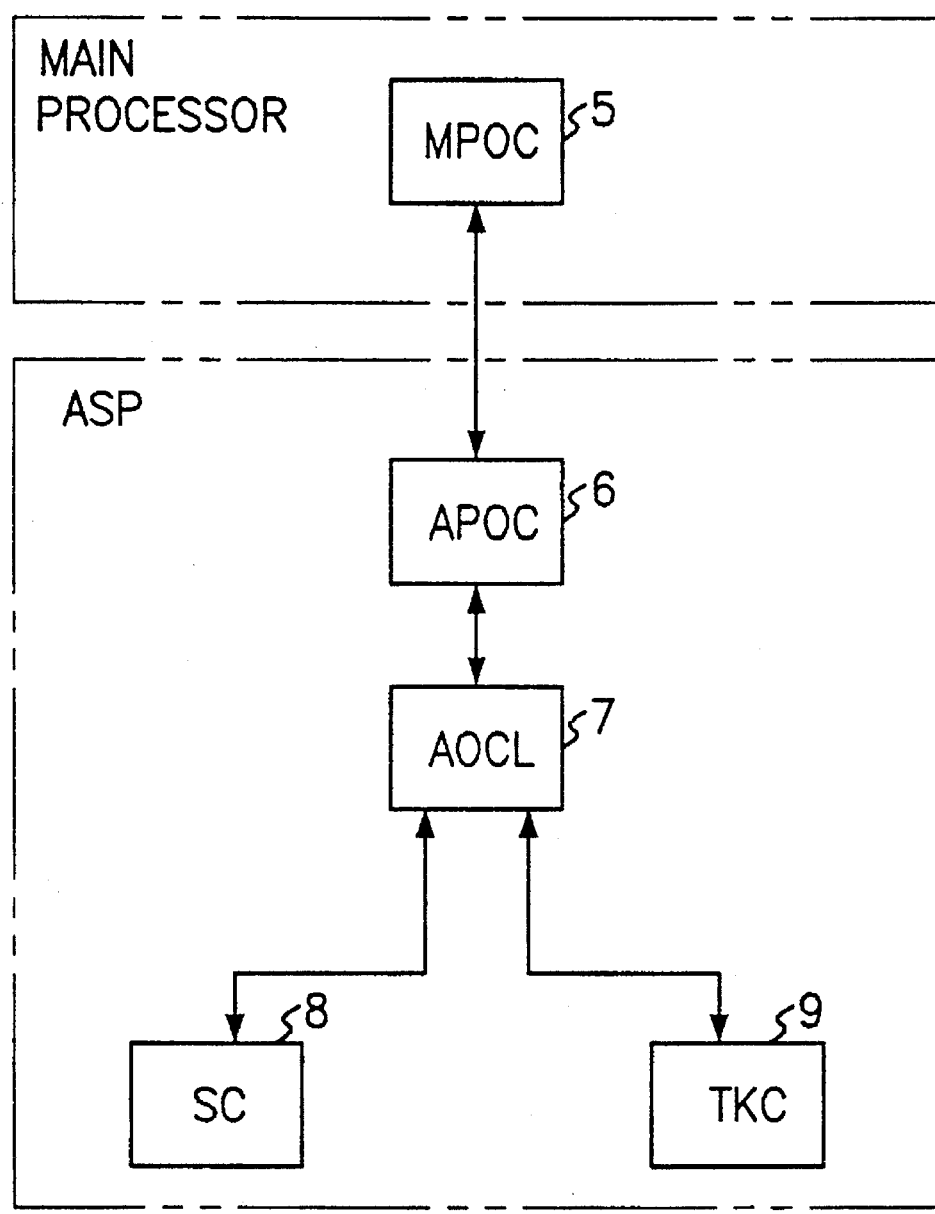
FIG. 2 is a block diagram illustrating a basic software in accordance with the present invention.

FIG. 2 is a block diagram illustrating a basic software in accordance with the present invention. As shown in FIG. 2, the basic software includes a main processor overload controller software (MPOC) 5 loaded in each main processor and adapted to execute a determination about and a control of an overload of the main processor at intervals of 10 seconds, and an ASP overload controller software (APOC) 6 loaded in each ASP and adapted to receive an overload control demand of the main processor, calculate a call approval value indicative of the number of calls acceptable for a control interval of 2 seconds in response to the received overload control demand and suppress calls through an ASP overload control library (AOCL) 7 at intervals of 2 seconds. The AOCL 7 is loaded in each ASP and adapted to interface between an overload controller for the ASP and a call processing software. The basic software further includes a subscriber controller software (SC) 8 loaded in each ASP and adapted to inform the ASP overload controller of the number of calls generated via the AOCL 7 and inquire about an approval of originating calls, and a trunk controller software (TKC) 9 loaded in each ASP and adapted to inform the ASP overload controller of a generation of an input trunk call via the AOCL 7 and inquire about an approval of the generated input trunk call.

Call control is realized using a method of calculating the call approval value indicative of the number of calls acceptable for an interval of 2 seconds for originating calls and input trunk calls and thereby accepting calls generated at the interval of 2 seconds as much as the call approval value while suppressing the remaining calls. The APOC 6 calculates the call approval value and then executes an application of the calculated call approval value using the AOCL 7. The SC 8 calls the AOCL 7 every time when an originating call is generated and inquires about an approval of the originating call. On the other hand, the TKC 9 calls the AOCL 7 every time when an input trunk call is generated and inquires about an approval of the input trunk call.

Figure 3:
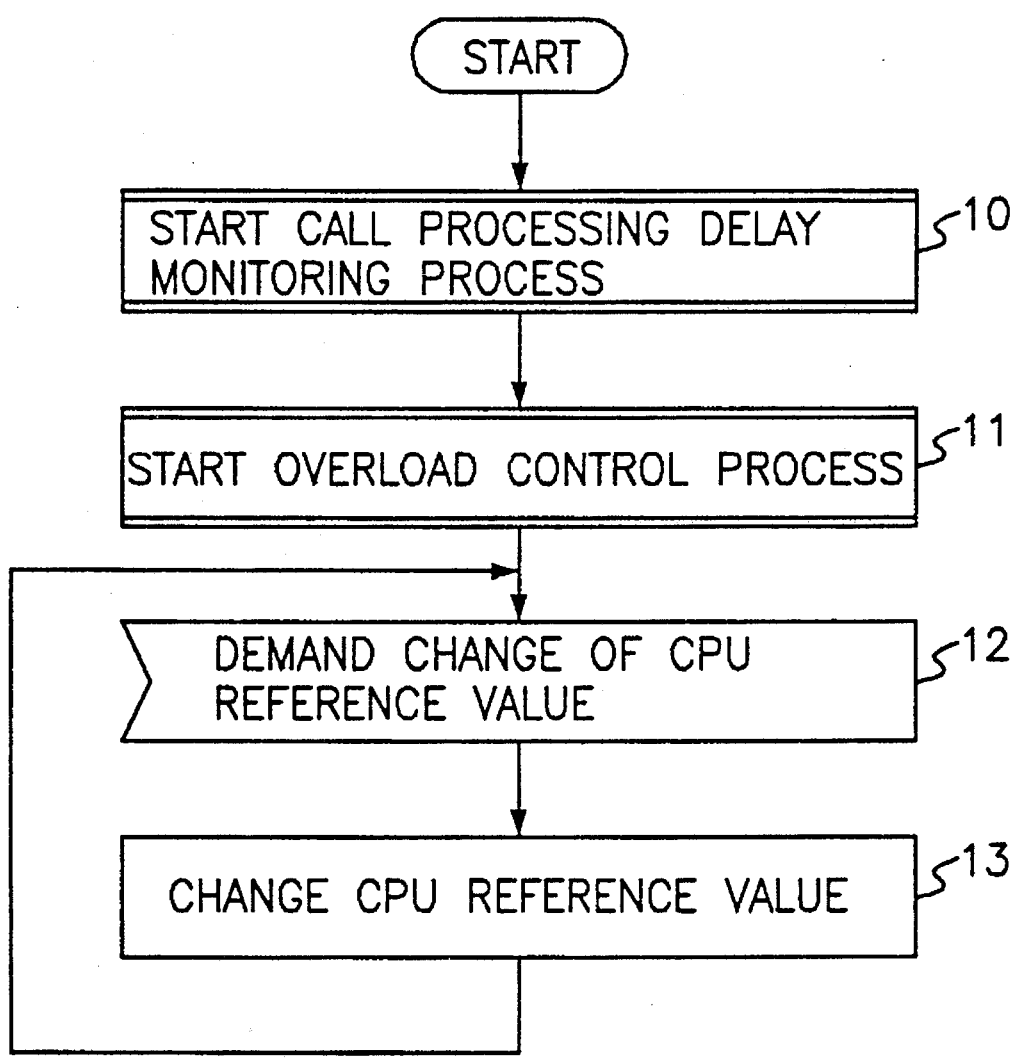
FIG. 3 is a flow chart illustrating a main procedure of a main processor overload controller software of a main processor overload controller in accordance with the present invention.

FIG. 3 is a flow chart illustrating the main procedure of the MPOC 5.

Once the MPOC 5 is loaded into one of the main processors and starts, a call processing delay monitoring process for reflecting a delay condition of the call processing process in a determination about an overload of the main processor is begun in accordance with its priority not higher than the priority of the call processing process, but higher than the priority of the operation and maintenance process (Step 10). An overload control process for executing the determination about and the control of the overload of the main processor is also begun in accordance with its priority higher than the priority of the call processing process (Step 11). After starting the processes required for the determination about the overload, a process of waiting for a signal from an operator requiring a change of a CPU reference value and changing the CPU reference value is repeatedly executed infinite times (Steps 12 and 13). The CPU reference value changed by the operator is used in the determination about the overload.

Figure 4:
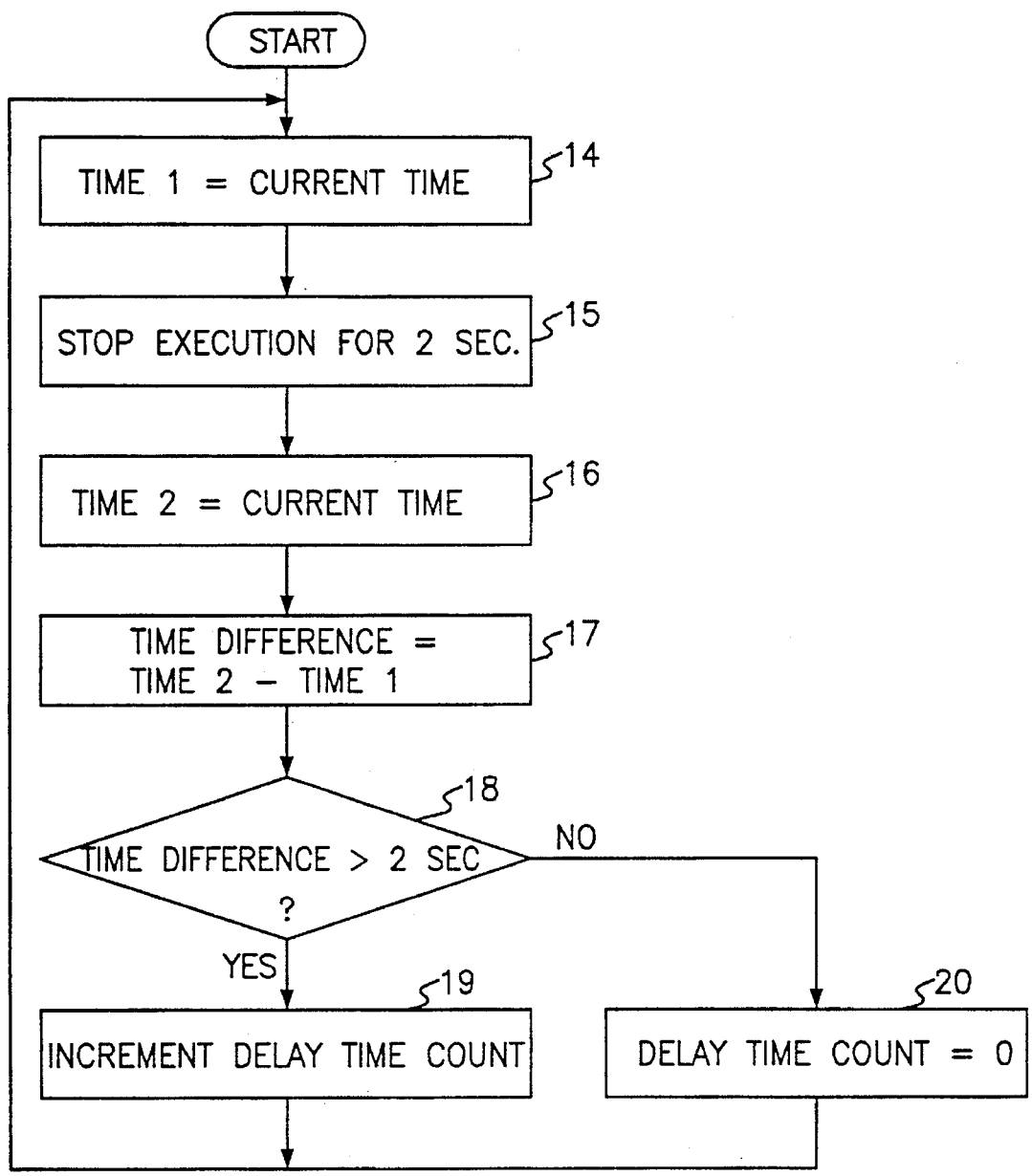
FIG. 4 is a flow chart illustrating a procedure of a call processing delay monitoring process of the main processor overload controller in accordance with the present invention.

FIG. 4 is a flow chart illustrating the procedure of the call processing delay monitoring process of a main processor overload controller.

Just after the main processor overload controller starts, the call processing delay monitoring process is begun and repeatedly executed at intervals of 2 seconds. Once the call processing delay monitoring process starts, the current time is read (Step 14). Thereafter, the call processing delay monitoring process is maintained at an execution stop state for 2 seconds (Step 15). After the 2 seconds elapses, the call processing delay monitoring process starts again to read the current time (Step 16). Subsequently, the time read before the execution stop state is deducted from the time currently read so as to derive a time difference (Step 17). A determination is then made about whether the derived time difference is more than 2 seconds (Step 18). When the time difference is more than 2 seconds, a delay time count is incremented by one (Step 19). When the time difference is not more than 2 seconds, the delay time count is set by zero (Step 20).

Figure 5A:
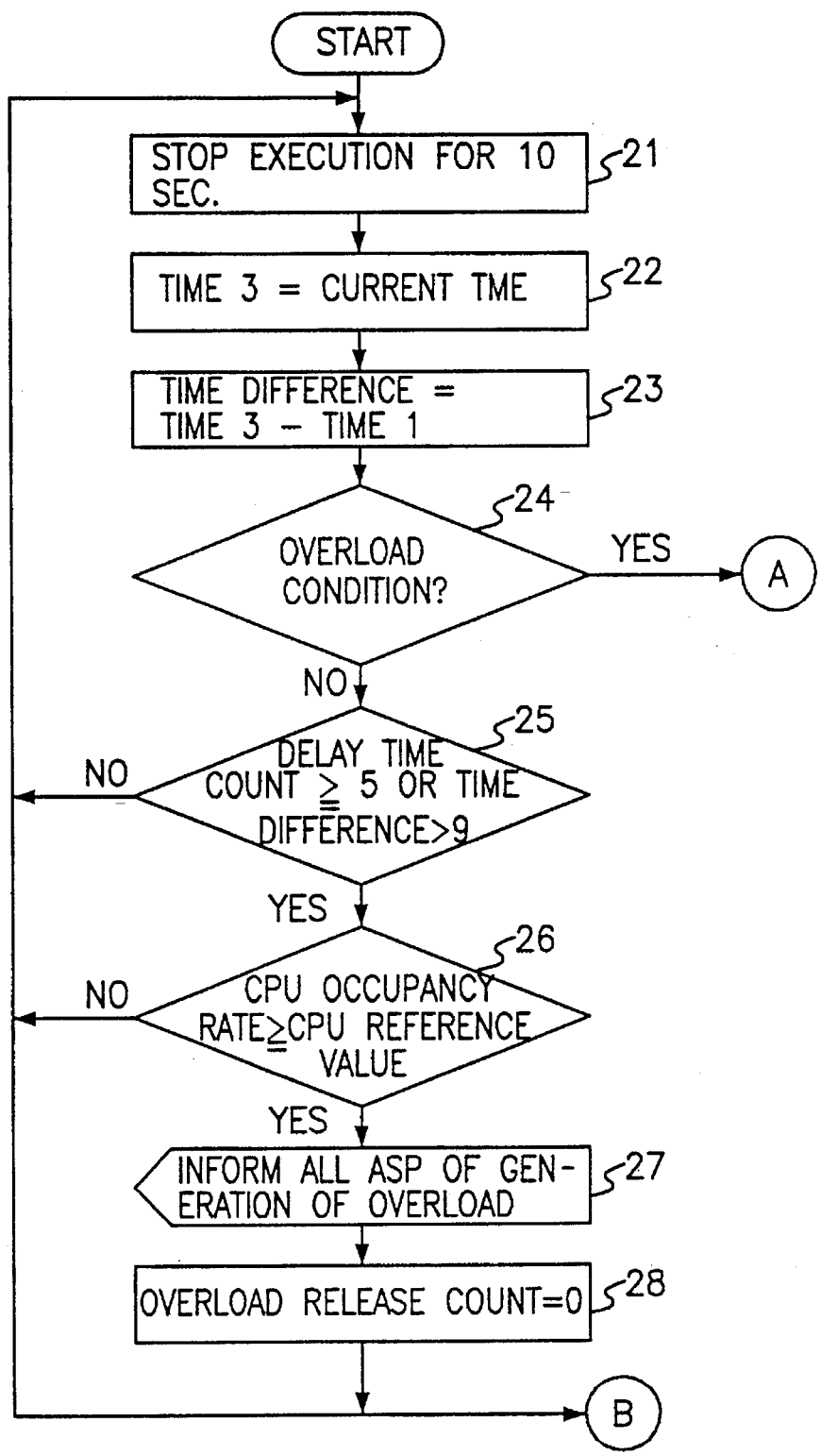
FIGS. 5A and 5B are flow charts respectively illustrating a procedure of an overload control process of the main processor overload controller in accordance with the present invention.
Figure 5B:
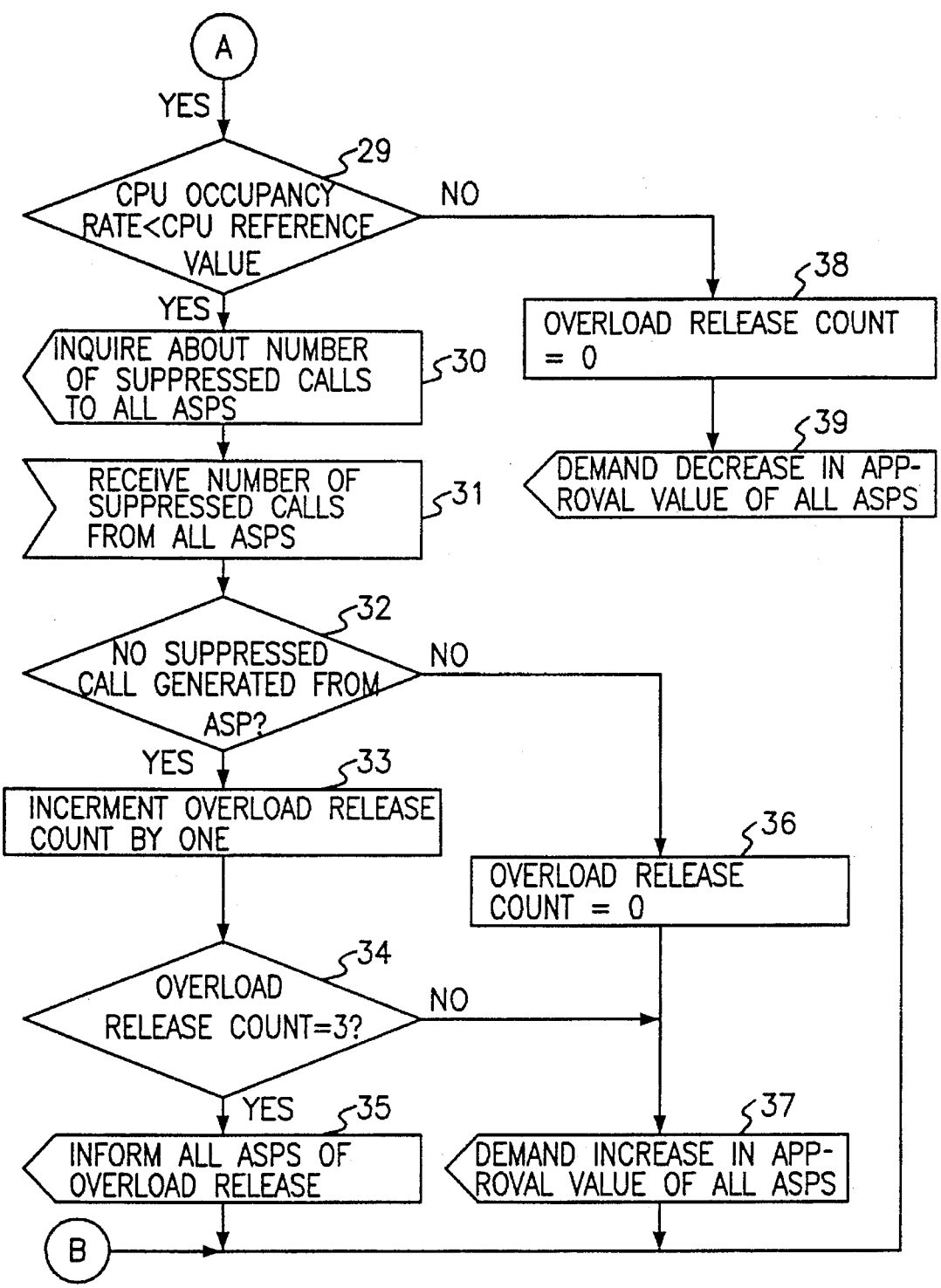

FIGS. 5A and 5B are flow charts respectively illustrating the procedure of the overload control process of the main processor overload controller.

The overload control process is repeatedly executed infinite times at intervals of 10 seconds to achieve the determination about and the control of the overload of the main processor. Once the overload control process starts, it is maintained at an execution stop state for 10 seconds (Step 21). Thereafter, the overload control process starts again to read the current time (Step 22). Subsequently, a difference between the time currently read and the time finally read in the call processing delay monitoring process is derived (Step 23). A determination is then made about whether the main processor is under an overload condition (Step 24). When the main processor is not under an overload condition, a determination is made about whether the delay time count accumulated in the call processing delay monitoring process is not less than 5 or whether the derived time difference is more than 9 (Step 25). Where the delay time count accumulated in the call processing delay monitoring process is not less than 5 or where the derived time difference is more than 9, a determination is also made about whether a CPU occupancy rate of 10 seconds is not less than the CPU reference value (Step 26). If the CPU occupancy rate of 10 seconds is not less than the CPU reference value, a determination is then made that an overload has occurred. All the ASPs are informed of the occurrence of the overload (Step 27). Subsequently, an overload release count is set to zero (Step 28). The overload release count is used upon releasing the overload. The reason why the time difference is used in addition to the delay time count is because a delay condition of the call processing process should be determined by deriving the time difference in the overload control process having the priority higher than the priority of the call processing process since the call processing delay monitoring process may not be executed due to its lower priority when a severe overload has occurred. By monitoring the delay condition of the call processing process, it is possible to prevent the occupancy of the CPU at a high rate by the operation and maintenance program of the lower priority from being erroneously determined as the overload and to prevent an abrupt increase or decrease in load from being erroneously determined as the overload. Under the overload condition, a determination is made about whether the CPU occupancy rate is less than the CPU reference (Step 29). Where the CPU occupancy rate is less than the CPU reference value, an inquiry is made of all ASPs about the number of calls suppressed in order to determine the decrease in CPU load as having been caused by a reduction in traffic or by a call suppression (Step 30). A receipt of the calls suppressed from all ASPs is then executed (Step 31). Based on the receipt of the calls suppressed, a determination is then made about whether no call suppressed has been generated from any ASP (Step 32). Where no call suppressed has been generated from any ASP, the overload release count is incremented by one (Step 33). A determination is then made about whether the incremented overload release count corresponds to 3 (Step 34). If the overload release count corresponds to 3, a determination is then made that the overload condition has been released, on the basis of the fact that no call suppressed has been generated from any ASP three times continuously. All the ASPs are informed of the release of the overload (Step 35). Where a determination that at least one call suppressed has been generated is determined at the step 32, the overload release count is set to zero (Step 36). A demand for an increase in approval value is then given to all ASPs (Step 37). The increase in approval value results in an increase in the traffic affecting the main processor. The increase in traffic results in an increase in CPU occupancy rate so that the CPU occupancy rate may approximate the CPU reference value, thereby extending the condition for releasing the overload condition. If a determination is made at the step 29 that the CPU occupancy rate is not less than the CPU reference value, the overload release count is set by zero (Step 38). A demand for a decrease in approval value is then given to all ASPs (Step 39) so as to decrease the traffic affecting the main processor.

Figure 6:
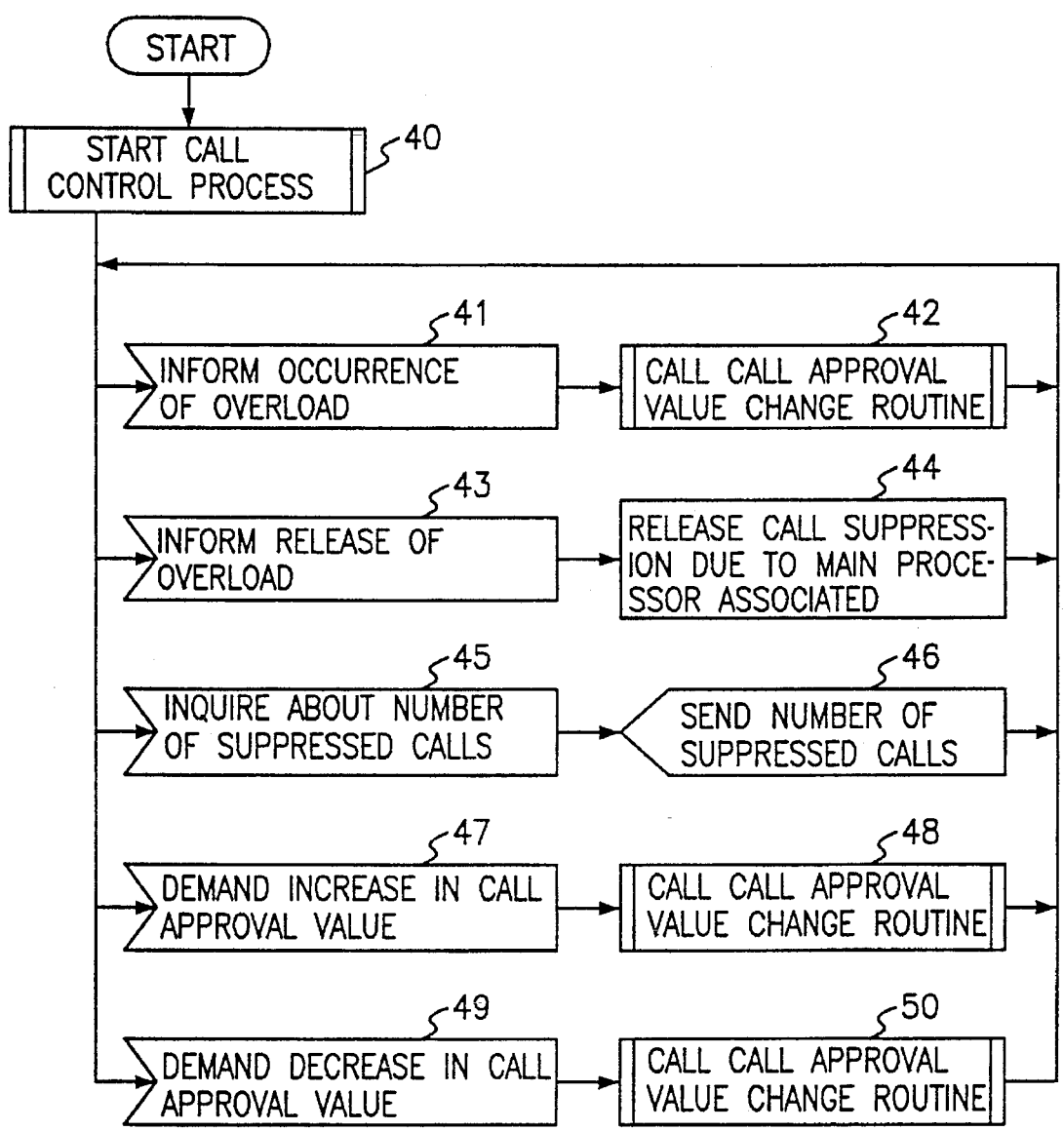
FIG. 6 is a flow chart illustrating a main procedure of a main processor overload control of an access switching processor overload controller.

FIG. 6 is a flow chart illustrating the main procedure of the main processor overload control of the ASP overload controller. When the ASPs operates initially, a call control process for executing a call suppression under the overload condition is begun (Step 40). The call control process is repeatedly executed infinite times. When the main processor informs of the occurrence of the overload at the step 27 (Step 41), a call approval value change routine is called and executed so as to change the call approval value (Step 42). When the main processor informs of the release of the overload at the step 35 (Step 43), the call suppression by the overload-released processor is released (Step 44). When the main processor inquires about the number of calls suppressed at the step 30 (Step 45), the number of calls suppressed for an interval of 10 seconds is reported (Step 46). Where the main processor generates the demand for the increase in call approval value at the step 37 (Step 47), the call approval value change routine is called and executed so as to increase the call approval value and thereby the traffic affecting the main processor (Step 48). On the other hand, the main processor generates the demand for the decrease in call approval value at the step 39 (Step 49), and the call approval value change routine is called and executed so as to decrease the call approval value (Step 50) and thereby the traffic affecting the main processor.

Figure 7B:
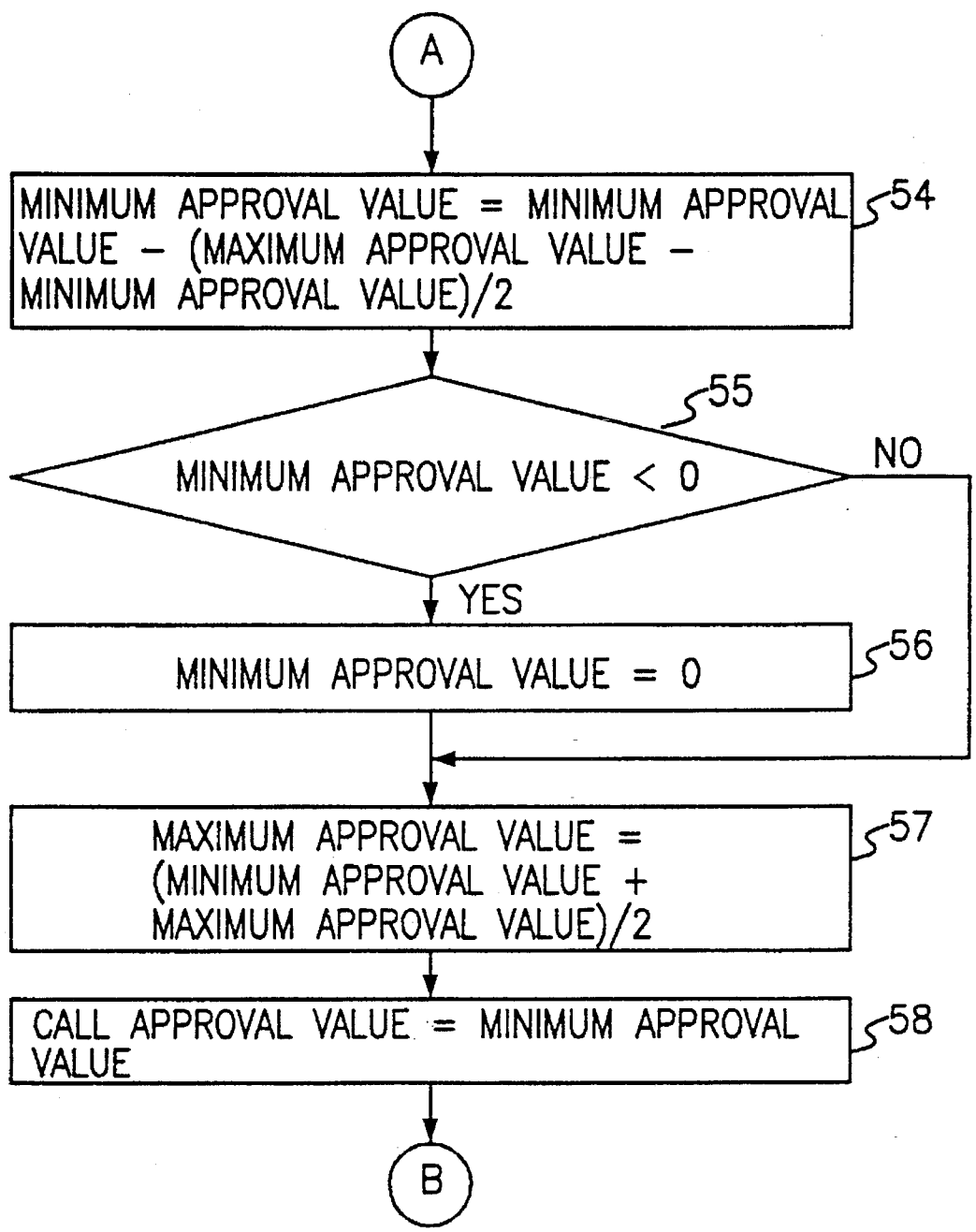

FIGS. 7A and 7B are flow charts respectively illustrating the call approval value change routine of the ASP overload controller.

The call approval value change routine is the routine for adjusting the traffic applied to the main processor in accordance with the demand of the main processor for the increase or decrease in call approval value. When the demand of the main processor is generated, the call approval value change routine executes a change of a maximum approval value and a minimum approval value. One of the changed maximum and minimum approval values is adopted as a call approval value. The minimum and maximum approval values are adjusted to apply an appropriate traffic to the main processor. By virtue of this adjustment, a difference between the minimum and maximum approval values approximates to zero when the overload condition continues long in existence. Upon being called due to an occurrence of a new overload, the call approval value change routine is executed. In accordance with the call approval value change routine, first, a determination is made about whether a new overload has occurred (Step 51). Where the new overload has occurred, the minimum approval value is set by zero. The maximum approval value is also initiated to be set by the sum of the number of successful originating calls obtained for the interval of 10 seconds and the number of successful input trunk calls for the same interval. As a call approval value, the minimum approval value is used (Step 52). If the determination that the new overload has occurred is not made at the step 51, a determination is then made whether a demand for a decrease in call approval value has been generated (Step 53). Upon being called due to the demand for the decrease in call approval value, the call approval value change routine is executed to derive a new minimum approval value by deducting a value resulting from a division of the difference between previous minimum and maximum approval values by 2 from the previous minimum approval value (Step 54). Thereafter, a determination is made about whether the derived minimum value is less than zero (Step 55). Where the derived minimum value is less than zero, the minimum approval value is set to zero (Step 56). A new maximum approval value is then derived by taking a value resulting from a division of the difference between the newly derived minimum approval value and the previous maximum approval value by 2 (Step 57). In the case of the decrease in call approval value, the minimum approval value is used as the call approval value (Step 58). Where a determination that the demand for the decrease in call approval value has been generated is not made at the step 53, that is, where a demand for an increase in call approval value has been generated, a check is made about whether a demand for a decrease in call approval value has been generated from a main processor other than the main processor associated with the occurrence of the overload (Step 59). Where there is no processor demanding the decrease in call approval value, a new maximum approval value is then derived by adding a value resulted from a division of the difference between the previous minimum and maximum approval values by 2 to the previous maximum approval value (Step 60). Thereafter, a determination is made about whether the newly derived maximum approval value is less than a value resulted from an addition of 5 to the previous maximum approval value (Step 61). Where the maximum approval value is less than the value resulting from the addition of 5 to the previous maximum approval value, the value resulting from the addition is determined as the maximum approval value (Step 62). The reason why the value resulting from the addition of 5 to the previous maximum approval value is determined as the maximum approval value is to ensure an increase in approval value when the demand for the increase in approval value has been generated. The addition of 5 is necessary because the call approval value is calculated for the interval of 10 seconds while the call suppression is made for the interval of 2seconds. A new minimum approval value is then derived by taking a value resulting from a division of the difference between the previous minimum approval value and the newly derived maximum approval value by 2, that is, a mean between the difference between the minimum and maximum approval values (Step 63). As a result, an increase in minimum approval value is made. Where a change of the call approval value is to be made in accordance with a demand for an increase in call approval value, the maximum approval value is used as the call approval value (Step 64). Since the call approval value is calculated using statistical call service data for the interval of 10 seconds, a value resulting from a division of the call approval value by 5 is applied for a control at intervals of 2 seconds (Step 65).

Figure 8:
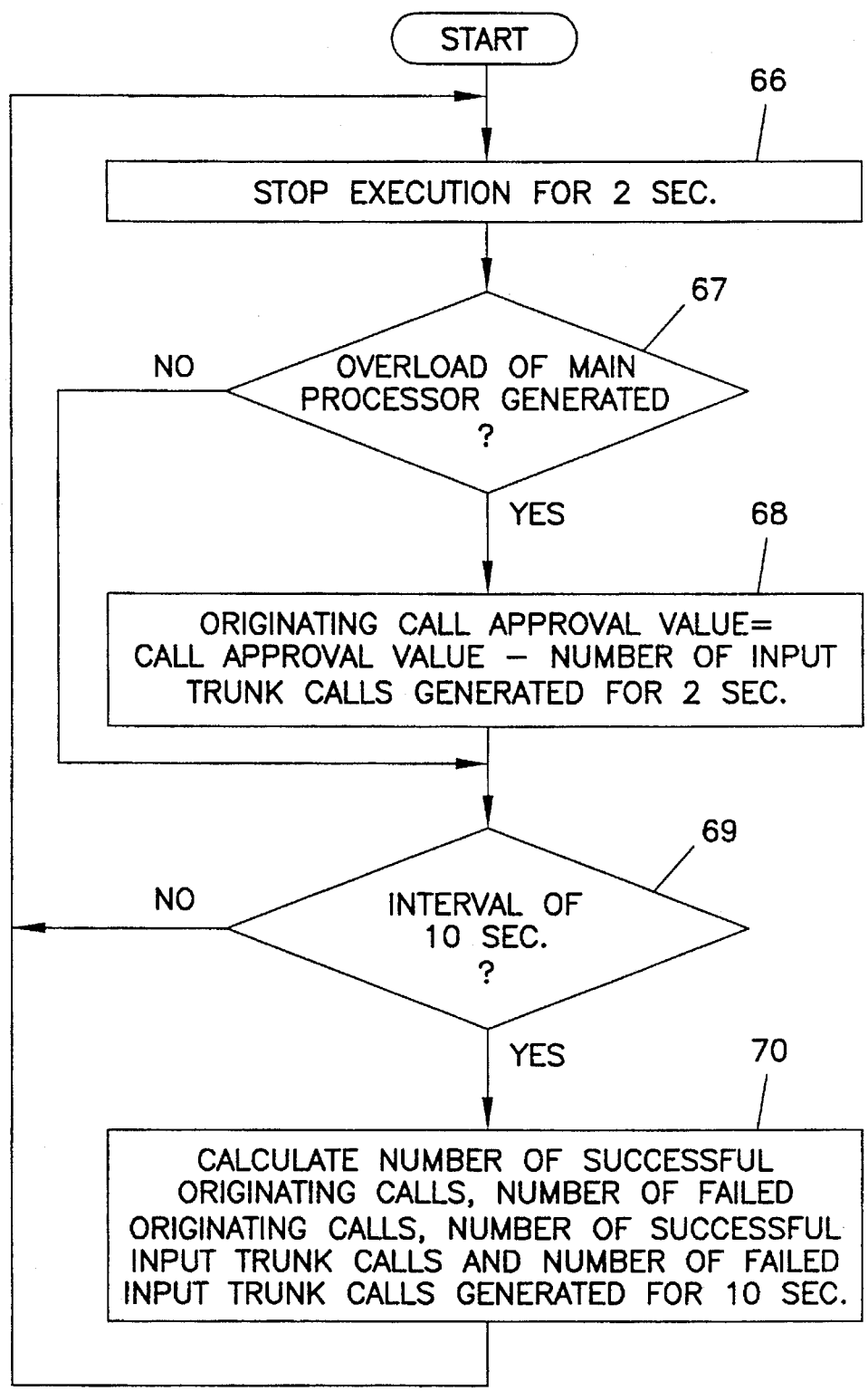
FIG. 8 is a flow chart illustrating a procedure of a call control process of the access switching processor overload controller.

FIG. 8 is a flow chart illustrating a procedure of a call control process of the ASP overload controller. The call control process is executed infinite times at intervals of 2seconds to calculate an originating call approval value and an input trunk call approval value for the control interval of 2seconds under a condition that the input trunk call has the priority over the originating call. Once the call control process starts, it is maintained at an execution stop state for 2 seconds (Step 66). Thereafter, the call control process starts again to determine whether an overload has occurred in the main processor (Step 67). Thereafter, an originating call approval value is calculated by deducting the number of input trunk calls for 2 seconds from the call approval value. As an input trunk call approval value, the call approval value is also used. In other words, a priority is assigned to the input trunk call so as to receive a larger number of input trunk calls than originating calls. Approval values for originating calls and input trunk calls are calculated to be used for a next interval of 2 seconds (Step 68). Subsequently, the number of successful originating calls, the number of failed originating calls, the number of successful input trunk calls and the number of failed input trunk calls are calculated at an interval of 10 seconds during the execution of the call control process (Steps 69 and 70). Values resulting from the calculations are used upon calculating the call approval value in the approval value change routine of FIGS. 7A and 7B (Step 70). The above procedure is repeatedly executed infinite times at intervals of 2 seconds.

As apparent from the above description, the present invention provides a method for controlling an overload of a main processor of a distributed switching system, capable of determining an overload caused by call processing traffic using a delay condition of a call processing process under an overload condition of the main processor, thereby preventing a failure of service due to an erroneous determination about overload, and capable of realizing control for maximizing the efficiency of the main processor while minimizing a failure of service under the overload condition of the main processor by controlling the main processor to perform only a determination about overload and a determination about increase and decrease of control and controlling a plurality of ASPs to automatically adjust an addition of traffic depending on the traffic processing capability of the main processor, thereby achieving a high service success rate of the main processor even under the overload condition.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method for controlling an overload of main processors in an electronic switching system in which part of the functions of the electronic switching system is performed in a centralized manner by main processors while functions associated with a generation of calls and a setting of calls are performed in a distributed manner by a plurality of lower-level processors, the method comprising the steps of:

(A) executing a call processing delay monitoring process at intervals of a first predetermined time in accordance with a priority not higher than a call processing process, but higher than an operation and maintenance process, thereby detecting a delay condition of the call processing process;

(B) executing an overload control process in accordance with a priority higher than the call processing process, thereby detecting a delay condition of the call processing process impossible to be detected by the call processing delay monitoring process so that information from the call processing delay monitoring process that the call processing process has delayed predetermined times continuously or for a second predetermined time is used for a determination about the overload, thereby preventing an abrupt increase and decrease in load or a load caused by a software not associated with a call processing from being determined as an overload; and (C) determining an occurrence of the overload when a CPU occupancy rate for the second predetermined time is not less than a CPU reference value while the condition of the step (A) is satisfied, and then informing all the lower-level processors of the occurrence of the overload.

2. A method in accordance with claim 1, wherein step (A) comprises the steps of:

(a) reading a current time at a first predetermined time interval during the execution of the call processing delay monitoring process;

(b) calculating a difference between two times read at the first predetermined time;

(c) incrementing a delay time count when the calculated time difference is more than the first predetermined time interval; and (d) setting the delay time count to zero when the calculated time difference is not more than the first predetermined time interval and continuously monitoring the delay condition of the call processing process to determine an occurrence of the overload.

3. A method in accordance with claim 1, wherein the overload control executed by a main processor at step (B) comprises the steps of:

(a) inquiring of all the lower-level processors by a main processor overload controller about the number of calls suppressed when the CPU occupancy rate is less than the CPU reference value under a condition that the overload has occurred in the main processor, and receiving the number of suppressed calls by the main processor overload controller;

(b) checking whether no call suppressed has been generated from any lower-level processor for three successive intervals;

(c) informing all the lower-level processors of a release of the overload when no call suppressed has been generated from any lower-level processor for three successive intervals, thereby preventing a call suppression caused by the lower-level processors;

(d) demanding an increase in approval value of all the lower-level processors when at least one call suppressed has been generated already before the step (b) or when at least one call suppressed has been generated from any lower-level processor within three successive intervals; and (e) demanding a decrease in approval value of all the lower-level processors when the CPU occupancy rate is not less than the CPU reference value under the condition that the overload has occurred.

4. A method in accordance with claim 1, wherein the overload control process executed by the lower-level processors at step (B) comprises the steps of:

(a) executing the call processing process by a lower-level processor overload controller at intervals of the first predetermined time, thereby executing the overload control at intervals of the first predetermined time;

(b) changing a call approval value when an occurrence of a new overload is reported or when a demand for an increase or decrease in call approval value is made;

(c) releasing a call suppression when a release of the new overload is reported, thereby preventing a call suppression caused by the main processor associated with the new overload; and (d) reporting the number of calls suppressed for an interval of the second predetermined time when a main processor inquires about the number of suppressed calls.

5. A method in accordance with claim 4, wherein step (b) comprises the steps of:

when a change in call approval value is required due to an occurrence of a new overload under a condition that a demand for a call approval value change has been generated from the main processor, setting a minimum approval value to zero, setting a maximum approval value by a sum of the number of successful originating calls and the number of successful input trunk calls respectively obtained for an interval of the second predetermined time, setting a call approval value by the minimum approval value;

when a change in call approval value is required due to the decrease in call approval value, setting the minimum approval value by a value obtained by deducting a value resulting from a division of a difference between previous minimum and maximum approval values by 2 from the previous minimum approval value while setting the minimum approval value by zero if the obtained value is less than zero, setting the maximum approval value by a value resulting from a division of a difference between the newly set minimum approval value and the previous maximum approval value by 2, and setting the call approval value by the minimum approval value;

when a change in call approval value is required due to the increase in call approval value, checking whether a demand for a decrease in call approval value has been generated from a main processor other than the main processor associated with the occurrence of the overload, and preventing any change in call approval value from being executed if the demand for the decrease in call approval value has been generated from the other main processor;

when no demand for the decrease in call approval value has been generated from any other main processor, setting the maximum approval value by a value derived by adding a value resulting from a division of the difference between the previous minimum and maximum approval values by 2 to the previous maximum value approval while setting the maximum approval value by a value resulting from an addition of a predetermined value to the previous maximum approval value if the maximum approval value is less than the value resulting from the addition of the predetermined value, setting the minimum approval value by a mean between the previous minimum approval value and the newly set maximum approval value, and setting the call approval value by the minimum approval value; and finally setting the call approval value by a value resulting from a division of the call approval value previously set at each of the above steps by a predetermined value so that the finally set call approval value is applied for the first predetermined time interval.

6. A method in accordance with claim 4, wherein step (a) comprises the steps of:

checking whether an overload has occurred in the main processor during a call control at intervals of the first predetermined time;

setting an originating call approval value by a value derived by deducting the number of input trunk calls required for the first predetermined time from a call approval value calculated when the overload has occurred in the main processor, and setting an input trunk call approval value by the calculated call approval value;

interfacing a subscriber controller for a call processing and a trunk controller and executing a call suppression by an application of the set originating call approval value and the set input trunk call approval value via a library;

initializing a reference originating call approval value, a reference input trunk call approval value, an originating call count and an input trunk call count by the library called to be ready for the call suppression; and calculating the number of successful originating calls, the number of successful input trunk calls, the number of failed originating calls, and the number of failed input trunk calls respectively generated for an interval of the second predetermined time when the second predetermined time has elapsed during the execution.

* * * * *